E. BARLOW.
COMBINED DEPTH AND ANGLE GAUGE.
APPLICATION FILED MAY 4, 1920.
1,429,999.
Patented Sept. 26, 1922.
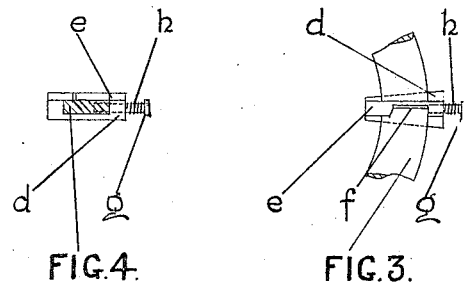
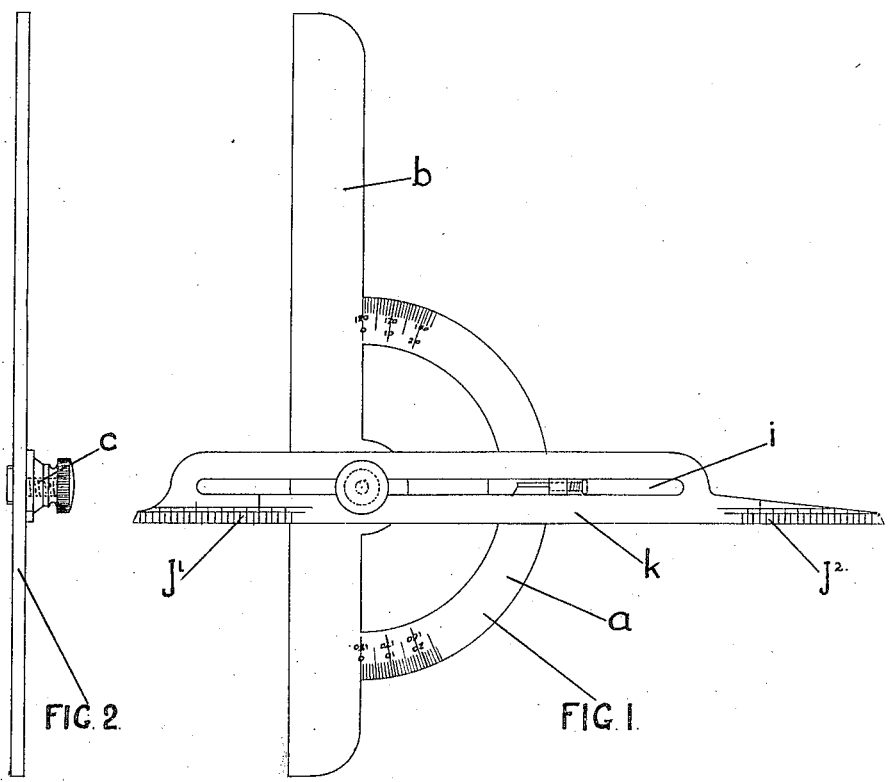
WITNESSES.
a. Barlow.
J. E. Randle.
INVENTOR.
E. Barlow.

Patented Sept. 26, 1922.

1,429,999

UNITED STATES PATENT OFFICE.

ERNEST BARLOW, OF FOLESHILL, COVENTRY, ENGLAND.

COMBINED DEPTH AND ANGLE GAUGE.

Application filed May 4, 1920. Serial No. 378,876.

*To all whom it may concern:*

Be it known that I, ERNEST BARLOW, a subject of the King of Great Britain, and a resident of 90 King George's Avenue, Foleshill, Coventry, Great Britain, have invented an Improvement in Combined Depth and Angle Gauges, of which the following description, in connection with the accompanying drawing, is a specification.

In order that my invention may be understood I attach hereto a drawing. Fig. 1. is a plan, and Fig. 2 an elevation of, the gauge complete. Fig. 3 is a plan, and Fig. 4 an elevation of, the angle indicator and spring stop, with a segment of the protractor.

This invention relates to apparatus for measuring angles, and gauging the depths of holes, recesses, or similar dimensions of the kind, in which there are combined a semi-circular protractor, at the centre of which there is mounted upon a pivot a graduated straight-edge member used for gauging the depths, etc., aforementioned, such member having a longitudinal slot whereby it may be slid longitudinally as well as rotated with regard to the pivot, and having means for holding it in set position, and also means for reading on the protractor the angle made by the straight edge and the base of the protractor.

The advantages of this invention are as follows:

The slotted blade part is easily detached from the base part and angle indicator part and reversed end for end, in order to use the long finger, said finger being a great advantage in measuring depths, and angles, down narrow holes or recesses, etc. A feature of the angle indicator is the spring stop pin, by which the gauge is instantly and rigidly fixed, as required, at the angle of ninety degrees, for use as depth gauge or square, said indicator ensuring greater accuracy of angle required by being some distance from the centre of the protractor. The greater length of the base line on one side of the centre of the protractor more than on the other is of great advantage in die-sinking, die-turning, and similar operations. The said gauge would be of great utility to die-sinkers, die-turners, general turners, fitters, markers out, etc., and two other features are its simplicity of design and absence of confusing multiplicity of graduations.

The aforementioned depth and angle gauge consists:—

(1) Of a flat protractor in shape as shewn in Fig. 1, having marked on the semi-circular segment $a$, degrees of angles 0° to 180°, and having a base $b$, said base being considerably longer on one side of the centre of the protractor than on the opposite side, said base having also a threaded pin $c$, Fig. 2, rigidly fixed through it at the centre of the aforementioned segment.

(2) Of an angle indicator, as shewn in Figs. 3 and 4, sliding on the aforementioned segment, and consisting of a bracket $d$, fitting round the segment, said bracket having an indicating plane $e$, rigidly fixed to it, with its indicating edge $f$, bevelled to facilitate reading of angle required. The indicator has also a circular stop pin $g$, fitting through its outer end, which said pin, when gauge is required to measure depths and to be used as a square, slips into a circular hole in the edge of the segment opposite the ninety degrees line, said pin being kept in such position by a spiral spring $h$ which is fastened securely to said indicator and stop pin.

(3) Of a flat blade, as shewn at $h$, Fig. 1, having a long central slot $i$, the same width as the aforementioned indicating plate $e$, and threaded pin $c$, said blade having at one end, at edge $k$, a short finger $j^1$, and at the opposite edge a longer finger $j^2$. The blade may have also, at edge $h$, graduated measurements on both surfaces for its full length, and is rigidly fixed as required, by milled nut and washer or other suitable means on the threaded pin $c$.

I do not confine myself to any particular section of blade fingers $j^1$ and $j^2$, which may be flat, round, or as required, or to any particular standard of measurements on the said blade.

Having now particularly described and ascertained the nature of my said invention, and in what manner the same is to be performed, I declare that what I claim is:—

1. In a combined depth and angle gauge, a flat protractor having a semi-circular segment, said protractor having marked on its semi-circular segment degrees of angles numbered 0° to 180°, and also a threaded pin rigidly fixed through its base at the centre of the said segment, upon which is pivotally and slidably mounted a graduated slotted flat blade, through the slot in which protrudes an angle indicator with spring stop, said indicator being slidable on the segment of the protractor.

2. In an angle and depth gauge as in claim 1, an angle indicator, said indicator sliding on the aforementioned segment, and having also a spring stop pin so arranged as to rigidly fix said indicator at an angle of ninety degrees when required.

3. In an angle and depth gauge as in claim 1, a graduated slotted flat blade, sliding on aforementioned indicator, and rotating about a threaded pin in the aforementioned base of the protractor, said blade being secured as required by milled nut and washer or other suitable means on said pin.

Dated this 13th day of April, 1920.

E. BARLOW.

Witnesses:
E. C. NICHOLLS,
E. WOOTTEN.